UNITED STATES PATENT OFFICE.

THOMAS H. LEAMING, OF BUFFALO, NEW YORK, ASSIGNOR TO NATIONAL ANILINE & CHEMICAL CO., INC., OF NEW YORK, N. Y., A CORPORATION OF NEW YORK.

AZO DYE.

1,372,439.   Specification of Letters Patent.   Patented Mar. 22, 1921.

No Drawing.   Application filed February 27, 1920. Serial No. 361,729.

*To all whom it may concern:*

Be it known that I, THOMAS H. LEAMING, a citizen of the United States, residing at Buffalo, in the county of Erie, State of New York, have invented certain new and useful Improvements in Azo Dyes; and I do hereby declare the following to be a full, clear, and exact description of the invention, such as will enable others skilled in the art to which it appertains to make and use the same.

The present invention relates to a new disazo dye which is of value for dyeing silk, cotton, wool and other fibers, and as a union dye for fabrics composed of various mixtures of these fibers. The invention includes also the dyed fabrics, or other materials, dyed with the new dyestuff.

The new dyestuff can be obtained by diazotizing acet-p-phenylenediamin, coupling the diazo compound so obtained with one molecular proportion of 1.8-aminonaphthol-4-sulfonic acid (S-acid), saponifying off the acetyl group, and coupling the intermediate monazo compound so obtained with another molecular proportion of diazotized acet-p-phenylene diamin. The new dyestuff in the form of its sodium salt has the following probable formula:

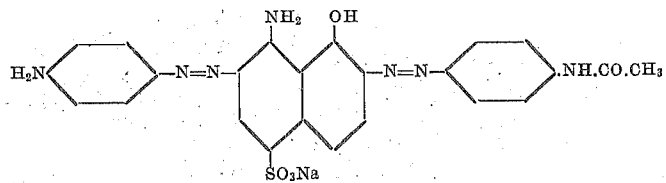

The following specific example will further illustrate the invention:

7.5 kg. of acet-p-phenylenediamin are dissolved in 200 liters of hot water, the solution cooled with ice, and 15 kg. of hydrochloric acid, sp. gr. 1.19 added. The cold solution is now diazotized in the usual manner with 3.45 kg. of sodium nitrite. 12.0 kg. of 1.8-aminonaphthol-4-sulfonic acid (S-acid) are dissolved in 10 liters of 10% aqueous caustic soda, the solution diluted to 200 liters, acidified with acetic acid and cooled in an ice bath. The cold solution of diazotized acet-p-phenylenediamin is now added and the mixture stirred until coupling is complete. The precipitated monazo dye is then filtered off and saponified (to split off the acetyl group and replace the same by hydrogen) by boiling it in 800 liters of 10% caustic soda solution. At the end of this time (about 5 hours), hydrochloric acid is added until the reaction is slightly acid, the solution cooled and the precipitated product filtered off. This product is then dissolved in 1,000 liters of water containing 30 kg. of sodium carbonate and to the cold solution there is added a diazotized solution of 7.5 kg. of acet-p-phenylenediamin (prepared as above), and the mixture stirred until the coupling is complete. It is then salted out with common salt, preferably at 80° C., cooled and filtered. If desired the dye may be purified by dissolving in water and reprecipitating.

The new disazo dye produced as described above, in the form of its sodium salt and in its dry and powdered state, is a reddish black powder, soluble in water with a green-blue color, soluble in alcohol with a blue color, and soluble in concentrated sulfuric acid with a blue-green color which solution upon dilution with ice-cold water turns to a green-blue color and finally, upon standing, produces a blue-black precipitate.

The new dyestuff dyes vegetable, animal and artificial fibers, such as cotton, wool, natural and artificial silk, etc., as well as union fabrics composed of mixtures of these fibers, producing in general greenish black shades which can be diazotized and developed upon the fiber or fabric with beta-naphthol, or meta-phenylenediamin, or meta-tolylenediamin or resorcin, or the like to give in general bluish to greenish shades of black which differ from the self-shade in tint and in superior fastness.

The dyed materials produced either by the action of the dyestuff itself, or by developing the new dyestuff on the fiber or fabric, as well as the new dyestuff itself, form a part of the present invention.

I claim:
1. The herein described new disazo dye having in the shape of its sodium salt the following probable formula:

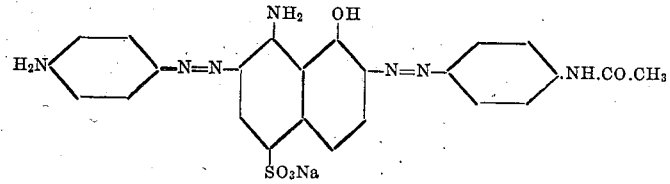

said dye, in the form of its sodium salt, being a reddish black powder soluble in water with a green-blue color, soluble in alcohol with a blue color, soluble in dilute alkali with a blue color, soluble in concentrated sulfuric acid with a blue-green color, and yielding upon saponification and reduction with stannous chlorid and hydrochloric acid p-phenylenediamin and tri-amino-8-naphthol-4-sulfonic acid; and dyeing cotton, wool, natural and artificial silk, or mixtures of the same, greenish shades of black which can be developed on the fiber.

2. The herein described new dye obtainable by diazotizing the new disazo dye of claim 1 and developing with a developing agent.

3. The herein described new dye obtainable by diazotizing the new disazo dye of claim 1 and developing with m-tolylenediamin.

4. Materials dyed with the new disazo dye of claim 1.

5. Union fabrics dyed with the new disazo dye of claim 1.

6. Materials dyed with the new disazo dye of claim 1, said dye being developed on the material.

7. Union goods dyed with the new disazo dye of claim 1, said dye being developed on the fabric.

In testimony whereof I affix my signature.

THOMAS H. LEAMING.